United States Patent
Okuzono

(10) Patent No.: US 11,394,846 B2
(45) Date of Patent: Jul. 19, 2022

(54) INFORMATION PROCESSING APPARATUS AND CONTROL METHOD FOR INFORMATION PROCESSING APPARATUS FOR TRANSITIONING FROM ONE POWER STATE TO ANOTHER POWER STATE

(71) Applicant: CANON KABUSHIKI KAISHA, Tokyo (JP)

(72) Inventor: Ryotaro Okuzono, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/156,283

(22) Filed: Jan. 22, 2021

(65) Prior Publication Data
US 2021/0243323 A1    Aug. 5, 2021

(30) Foreign Application Priority Data
Jan. 31, 2020  (JP) .............................. JP2020-015839

(51) Int. Cl.
| | | |
|---|---|---|
| *H04N 1/00* | (2006.01) | |
| *H04N 1/333* | (2006.01) | |
| *G06F 3/12* | (2006.01) | |
| *G11B 15/467* | (2006.01) | |

(52) U.S. Cl.
CPC ....... *H04N 1/00896* (2013.01); *G06F 3/1221* (2013.01); *G06F 3/1259* (2013.01); *G11B 15/467* (2013.01); *H04N 1/00904* (2013.01); *H04N 1/333* (2013.01); *G06F 3/1286* (2013.01)

(58) Field of Classification Search
CPC .............. H04N 1/00896; H04N 1/333; H04N 1/00904; G06F 3/1259; G06F 3/1221; G06F 3/1286
See application file for complete search history.

(56) References Cited

U.S. PATENT DOCUMENTS

| | | | | |
|---|---|---|---|---|
| 2013/0057883 A1* | 3/2013 | Ohshima | ............ | H04N 1/00896 358/1.9 |
| 2014/0300917 A1* | 10/2014 | Ito | ......................... | G06F 3/1221 358/1.14 |
| 2019/0052764 A1* | 2/2019 | Hara | ...................... | G11B 19/02 |

FOREIGN PATENT DOCUMENTS

JP    2013-045452 A    3/2013

\* cited by examiner

*Primary Examiner* — Nicholas Pachol
(74) *Attorney, Agent, or Firm* — Canon U.S.A., Inc. IP Division

(57) ABSTRACT

An information processing apparatus includes a power controller configured to perform one of first control, which, in response to the information processing apparatus transitioning from a second power state to a first power state, supplies electric power to a storage device and drives a spindle motor, and second control, which, in response to the information processing apparatus transitioning from the second power state to the first power state, supplies electric power to the storage device without driving the spindle motor, wherein, when the information processing apparatus is in the second power state, the power controller performs the first control based on a state controller receiving a first request signal, and the power controller performs the second control based on the state controller receiving a second request signal different from the first request signal.

14 Claims, 15 Drawing Sheets

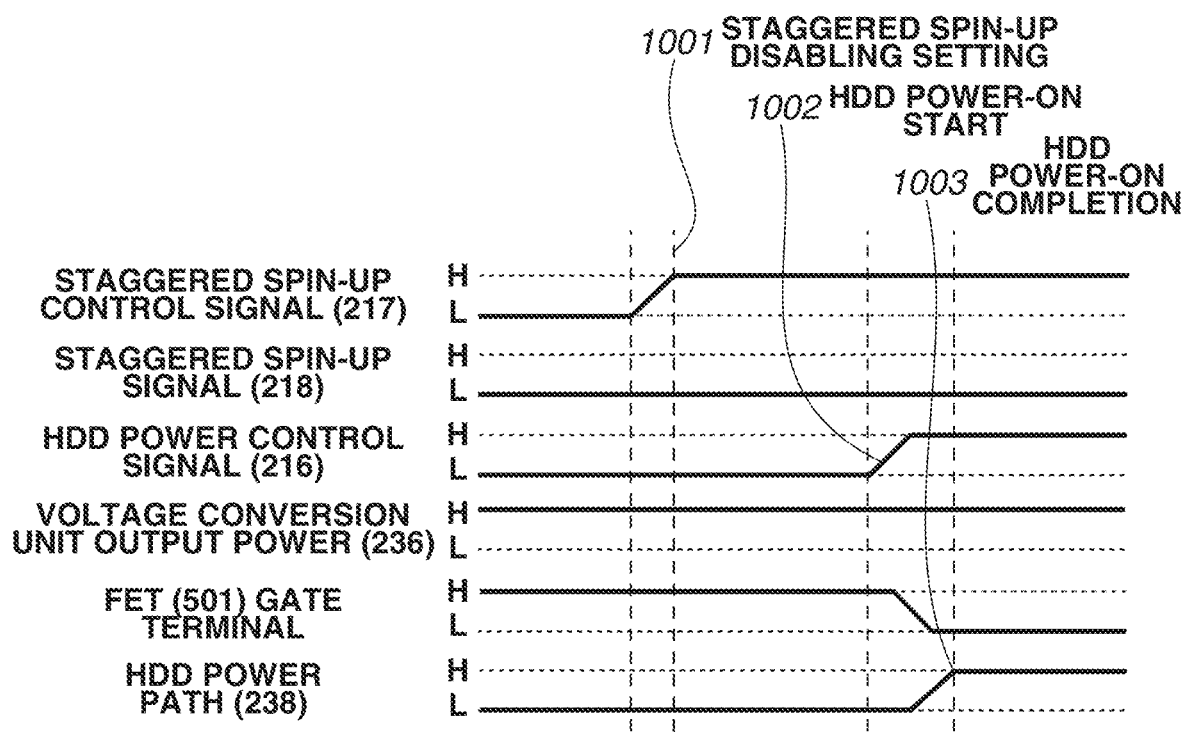
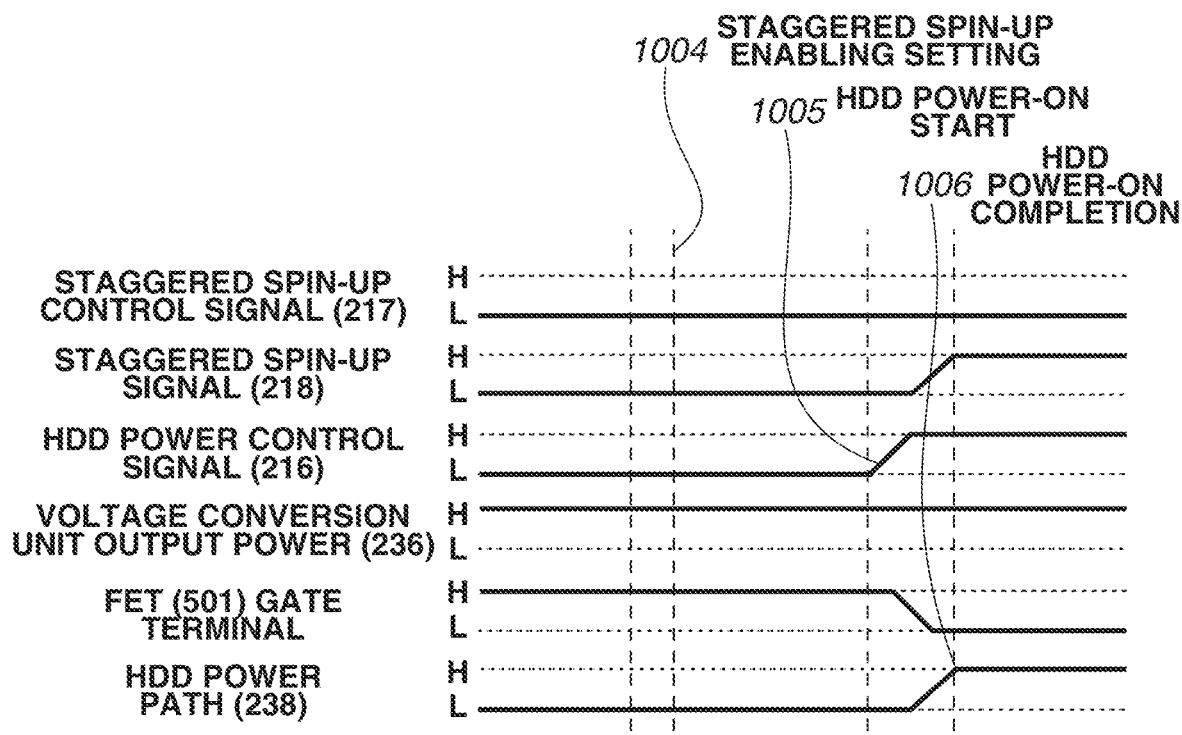

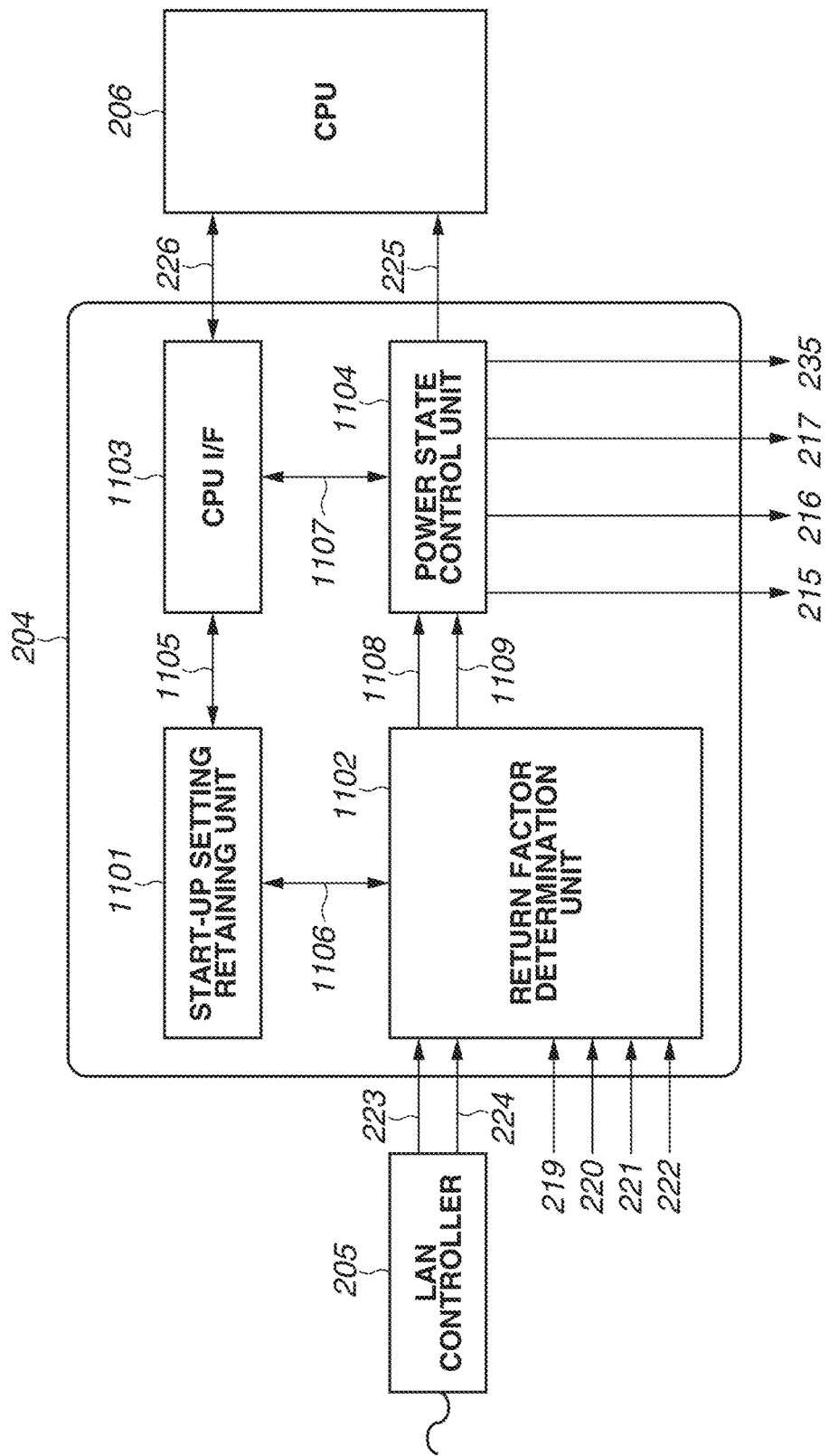

FIG.15A

| START-UP/RETURN CONDITION | STAGGERED SPIN-UP FUNCTION |
|---|---|
| 1501 — AT THE TIME OF RETURN FROM SLEEP (LAN, PRINT JOB SYSTEM) | DISABLED |
| 1502 — AT THE TIME OF RETURN FROM SLEEP (LAN, INQUIRY SYSTEM) | ENABLED |

FIG.15B

| START-UP/RETURN CONDITION | STAGGERED SPIN-UP FUNCTION |
|---|---|
| 1501 — AT THE TIME OF RETURN FROM SLEEP (LAN, PRINT JOB SYSTEM) | DISABLED |
| 1502 — AT THE TIME OF RETURN FROM SLEEP (LAN, INQUIRY SYSTEM) | ENABLED |
| 1503 — AT THE TIME OF RETURN FROM SLEEP (MANUAL FEED DETECTION) | DISABLED |
| 1504 — AT THE TIME OF RETURN FROM SLEEP (ADF DOCUMENT DETECTION) | DISABLED |
| 1505 — AT THE TIME OF RETURN FROM SLEEP (FAX INCOMING DETECTION) | DISABLED |
| 1506 — AT THE TIME OF MFP START-UP | DISABLED |

FIG.15C

| START-UP/RETURN CONDITION | STAGGERED SPIN-UP FUNCTION |
|---|---|
| 1501 — AT THE TIME OF RETURN FROM SLEEP (LAN, PRINT JOB SYSTEM) | DISABLED |
| 1502 — AT THE TIME OF RETURN FROM SLEEP (LAN, INQUIRY SYSTEM) | ENABLED |
| 1503 — AT THE TIME OF RETURN FROM SLEEP (MANUAL FEED DETECTION) | DISABLED |
| 1504 — AT THE TIME OF RETURN FROM SLEEP (ADF DOCUMENT DETECTION) | DISABLED |
| 1505 — AT THE TIME OF RETURN FROM SLEEP (FAX INCOMING DETECTION) | DISABLED |
| 1506 — AT THE TIME OF MFP START-UP | DISABLED |
| 1507 — AT THE TIME OF RETURN FROM SLEEP (OPERATION UNIT PRESSED) | DISABLED |

INFORMATION PROCESSING APPARATUS AND CONTROL METHOD FOR INFORMATION PROCESSING APPARATUS FOR TRANSITIONING FROM ONE POWER STATE TO ANOTHER POWER STATE

BACKGROUND

Field of the Disclosure

Aspects of the present disclosure generally relate to an information processing apparatus and a control method for the information processing apparatus.

Description of the Related Art

External storage devices, such as hard disk drives (HDDs) and solid state drives (SSDs), employ an interface compliant with the Serial ATA (SATA) standard. Such a SATA interface is equipped with a spin-up control function (staggered spin-up function), which decentralizes rush currents occurring when a plurality of external storage devices starts up.

A spindle motor for use in HDDs requires the largest current at the instant of starting of spin-up at start-up. Usually, when powered on, an HDD performs initialization of a physical layer (PHY) of the SATA interface, and then starts spin-up of the spindle motor. On the other hand, the staggered spin-up function is a technique which performs only the initialization of a PHY of the SATA interface and starts spin-up of the spindle motor only after receiving a command via the SATA interface.

Thus, using the staggered spin-up function enables reducing power consumption occurring at the time of power-on of the HDD. However, since spin-up of the spindle motor is started after reception of a SATA command, the time required for the HDD to become accessible may become longer than at the usual time.

Under such circumstances, Japanese Patent Application Laid-Open No. 2013-45452 discusses a method of controlling spin-up of an HDD by providing a SATA connector with a pin base, which is used to switch between enablement and disablement of a staggered spin-up function, and physically switching jumper connections.

SUMMARY

According to embodiments of the present disclosure, an information processing apparatus including a non-volatile storage device equipped with a spindle motor includes a state controller configured to cause the information processing apparatus to transition to one of a first power state, in which electric power is supplied to the storage device, and a second power state, in which power consumption is lower than in the first power state and electric power is not supplied to at least the storage device, and a power controller configured to perform one of first control, which, in response to the information processing apparatus transitioning from the second power state to the first power state, supplies electric power to the storage device and drives the spindle motor, and second control, which, in response to the information processing apparatus transitioning from the second power state to the first power state, supplies electric power to the storage device without driving the spindle motor, wherein, when the information processing apparatus is in the second power state, the power controller performs the first control based on the state controller receiving a first request signal, and the power controller performs the second control based on the state controller receiving a second request signal different from the first request signal.

Further features of the present disclosure will become apparent from the following description of exemplary embodiments with reference to the attached drawings.

BRIEF DESCRIPTION OF THE DRAWINGS

FIGS. 10A and 10B are timing charts each illustrating return-from-sleep processing which the HDD control unit performs.

FIG. 11 is a block diagram illustrating an internal configuration of the power control unit.

FIGS. 15A, 15B, and 15C are diagrams illustrating lists of pieces of return setting information.

DESCRIPTION OF THE EMBODIMENTS

Various exemplary embodiments, features, and aspects of the disclosure will be described in detail below with reference to the drawings. Furthermore, the following exemplary embodiments are not intended to limit the scope of the disclosure, and not all of the combinations of characteristics described in the respective exemplary embodiments are necessarily essential for solutions in the disclosure. According to some exemplary embodiments, an image processing apparatus is used as an example of an information processing apparatus.

Figure 1:
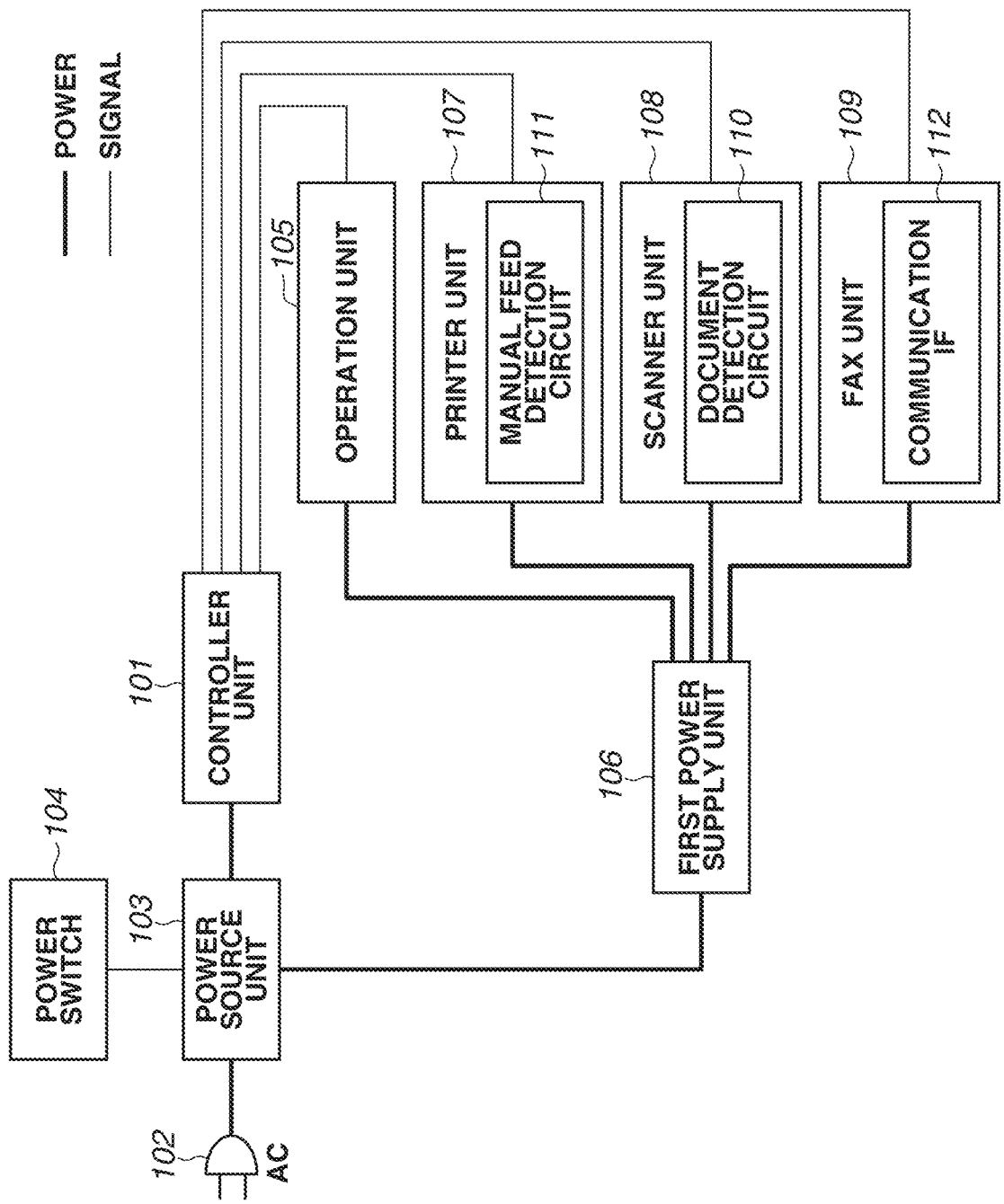
FIG. 1 is a block diagram illustrating an internal configuration of an image processing apparatus.

FIG. 1 is a block diagram illustrating a power control configuration included in an image processing apparatus according to a first exemplary embodiment.

Referring to FIG. 1, the image processing apparatus includes a controller unit 101, an alternating current (AC) plug 102, a power source unit 103, a power switch 104, a first power supply unit 106, an operation unit 105, a scanner unit 108, a printer unit 107, and a facsimile (FAX) unit 109.

The image processing apparatus is able to perform various processing operations such as scan processing and print processing, and the controller unit 101 comprehensively controls the entire image processing apparatus. The AC plug 102 is inserted into an external outlet, and electric power is supplied from the external outlet to the power source unit 103 via the AC plug 102. The power source unit 103 converts alternating current power into direct current power, and supplies the direct current power to each of the controller unit 101 and the first power supply unit 106.

The power switch 104 is a switch used for the user to control start-up and stopping of the image processing apparatus, and is configured with, for example, a seesaw switch which physically retains a state indicating one of start-up and stopping of the image processing apparatus.

The power switch 104, when operated by the user, notifies the power source unit 103 that the power switch 104 has been operated. The operation unit 105 includes a display unit and operation keys, and receives an instruction for execution of each processing operation input from the user. The first power supply unit 106 supplies electric power supplied from the power source unit 103 to each of the operation unit 105, the scanner unit 108, the printer unit 107, and the FAX unit 109.

The scanner unit 108 reads a document placed on a platen to generate image data. Alternatively, the scanner unit 108 reads a document placed on an auto document feeder (ADF) to generate image data. The ADF of the scanner unit 108 includes a document detection circuit 110. The document detection circuit 110 is a sensor which detects a document placed on the ADF, and electric power is supplied to the document detection circuit 110 even when the image processing apparatus is in sleep mode.

The printer unit 107 performs printing on a sheet based on, for example, image data generated by the scanner unit 108. The printer unit 107 includes a manual feed tray (not illustrated) including a manual feed detection circuit 111. The manual feed detection circuit 111 is a sensor which, when a sheet is placed on the manual feed tray, detects the sheet, and electric power is supplied to the manual feed detection circuit 111 even when the image processing apparatus is in sleep mode.

The FAX unit 109 performs transmission and reception of digital data (a facsimile job) via a communication line such as a telephone line. The FAX unit 109 includes a communication interface (IF) 112 connected to a telephone line. The communication IF 112 is an IF which receives a communication from an external apparatus, and electric power is supplied to the communication IF 112 even when the image processing apparatus is in sleep mode.

Figure 2:
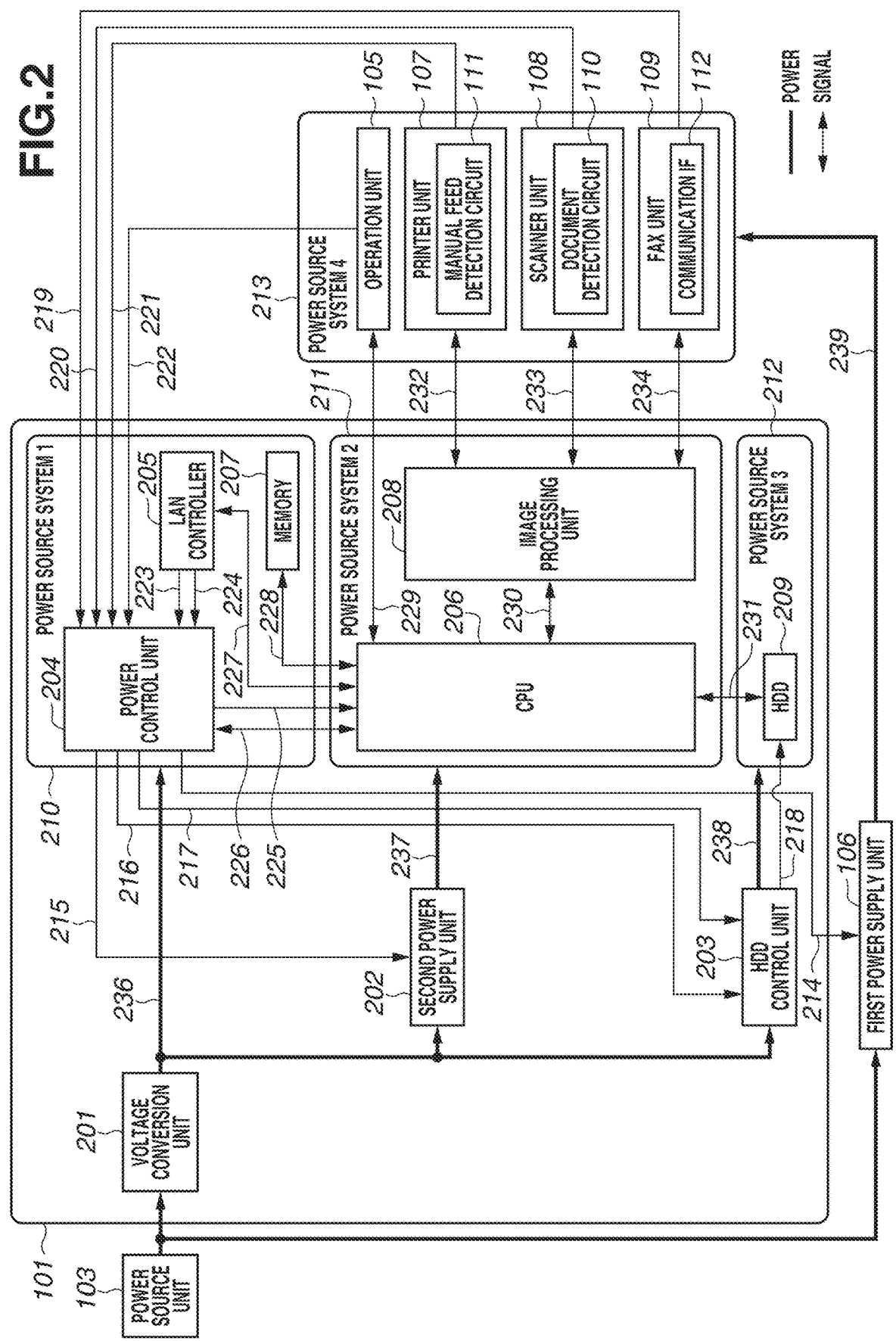
FIG. 2 is a block diagram illustrating an internal configuration of a controller unit included in the image processing apparatus.

FIG. 2 is a block diagram illustrating an internal configuration of the controller unit 101 included in the image processing apparatus according to the first exemplary embodiment.

The controller unit 101 includes a voltage conversion unit 201, a second power supply unit 202, a hard disk drive (HDD) control unit (storage control unit) 203, a power control unit 204, a local area network (LAN) controller 205, a central processing unit (CPU) 206, a memory 207, an image processing unit 208, and an HDD 209.

The voltage conversion unit 201 converts a power source voltage supplied from the power source unit 103 into a voltage requested from each power source system and supplies the requested voltage to each power source system via a power source path 236. The second power supply unit 202 supplies electric power supplied from the voltage conversion unit 201 to a power source system 2 (211) via a power source path 237 or interrupts supplying the electric power, according to a control signal 215 output from the power control unit 204.

The power source system 2 (211) includes the CPU 206 and the image processing unit 208, and electric power is supplied from the second power supply unit 202 to the power source system 2 (211). The CPU 206 controls an operation of the entire image processing apparatus, and operates by software loaded onto the memory 207. Moreover, the CPU 206 executes a program stored in the HDD 209 via a SATA interface (I/F) 231 to perform various control operations.

The image processing unit 208 performs image processing such as color space conversion on a digital image input from the scanner unit 108 or the FAX unit 109, and outputs data obtained by performing such image processing to the CPU 206. Moreover, the image processing unit 208 performs image processing such as color space conversion based on image data input from the CPU 206 to convert the image data into bit-mapped data, and outputs the bit-mapped data to the printer unit 107.

The HDD control unit (storage control unit) 203 is a control unit which performs power control and signal control over the HDD 209. The HDD control unit 203 supplies electric power supplied from the voltage conversion unit 201 to the HDD 209, which is a power source system 3 (212), via a power path 238 or interrupts supplying the electric power, according to an HDD power control signal 216 output from the power control unit 204.

Moreover, the HDD control unit 203 receives a staggered spin-up control signal 217 output from the power control unit 204. Then, the HDD control unit 203 controls a staggered spin-up signal 218, which is transmitted to the HDD 209, according to the received staggered spin-up control signal 217.

The HDD 209 is a non-volatile storage device which temporarily stores programs which the CPU 206 executes and print data received from a network via the LAN controller 205.

Electric power is supplied to the LAN controller 205 even when the image processing apparatus is in a sleep state, which is a power-saving state, so that the LAN controller 205 is able to receive a network packet. Upon receiving the network packet, the LAN controller 205 analyzes the received network packet. Then, if the received network packet is a print job such as print data, the LAN controller 205 communicates a return-from-sleep request to the power control unit 204 via a print job return request signal 223. Moreover, if the received network packet is other than a print job, for example, an inquiry about status information, the LAN controller 205 communicates a return-from-sleep request to the power control unit 204 via a non-print job return request signal 224.

A power source system 1 (210) includes the power control unit 204, the LAN controller 205, and the memory 207, and electric power is supplied from the voltage conversion unit 201 to the power source system 1 (210).

The power control unit 204 performs switching control of the second power supply unit 202, the HDD control unit 203, and the first power supply unit 106 to supply electric power to each unit of the image processing apparatus or interrupt supplying the electric power, according to a control program which the CPU 206 executes. Additionally, the power control unit 204 receives return request signals 219 to 224 from respective units of the image processing apparatus.

The LAN controller 205 is connected to an information processing apparatus, such as a personal computer (PC), via a network (not illustrated). Then, the LAN controller 205 performs reception processing for print data transmitted from the information processing apparatus and response processing for an inquiry about status information, such as an operating status of the image processing apparatus and information about consumables.

The memory 207 is a volatile memory such as a double data rate (DDR) synchronous dynamic random-access memory (SDRAM), and is a main memory which stores, for example, data generated by the CPU 206 executing each control program.

Next, power source systems of the image processing apparatus are described with reference to FIG. 2.

Since the power source system 1 (210) performs processing for managing a power-supply state of the entire image processing apparatus and processing for returning from a power-saving state (sleep state) thereof, as long as the power switch 104 is in a power-on state, electric power is never blocked from being supplied to the power source system 1 (210) even in any power state. In other words, electric power is supplied to the power source system 1 (210) in a case where the image processing apparatus is a power-saving state and in a normal power state.

Control over blocking and supplying of electric power to the power source system 2 (211) is performed by the second power supply unit 202 being controlled via the control signal 215 output from the power control unit 204. Electric power is stopped from being supplied to the power source system 2 (211) in a case where the image processing apparatus is in a power-saving state, and electric power is supplied to the power source system 2 (211) in a case where the image processing apparatus is in a normal power state.

Control over blocking and supplying of electric power to the power source system 3 (212) is performed by the HDD control unit 203 being controlled via the HDD power control signal 216 output from the power control unit 204.

Electric power is stopped from being supplied to the power source system 3 (212) in a case where the image processing apparatus is in a power-saving state, and electric power is supplied to the power source system 3 (212) in a case where the image processing apparatus is in a normal power state.

A power source system 4 (213) is a power source system which supplies electric power to the operation unit 105, the printer unit 107, the scanner unit 108, and the FAX unit 109. Control over blocking and supplying of electric power to the power source system 4 (213) is performed by the first power supply unit 106 being controlled via the control signal 214 output from the power control unit 204. Furthermore, electric power is stopped from being supplied to the power source system 4 (213) in a case where the image processing apparatus is in a power-saving state, and electric power is supplied to the power source system 4 (213) in a case where the image processing apparatus is in a normal power state.

At the time of a transition of the image processing apparatus from a power-saving state to a normal power state, the following processing is performed. When the image processing apparatus is in a power-saving state, upon receiving a return request signal out of the return request signals 219 to 224, the power control unit 204 causes the CPU 206 to return from a power-saving state. Specifically, the power control unit 204 communicates returning from a power-saving state to the CPU 206 via the return request signal 225, thus causing the CPU 206 to transition from a power-saving state to a normal power state. Then, the CPU 206 checks which of the return request signals 219 to 224 the return request signal received by the power control unit 204 is, and then performs processing corresponding to a return factor. Details of such processing are described below.

Figure 3:
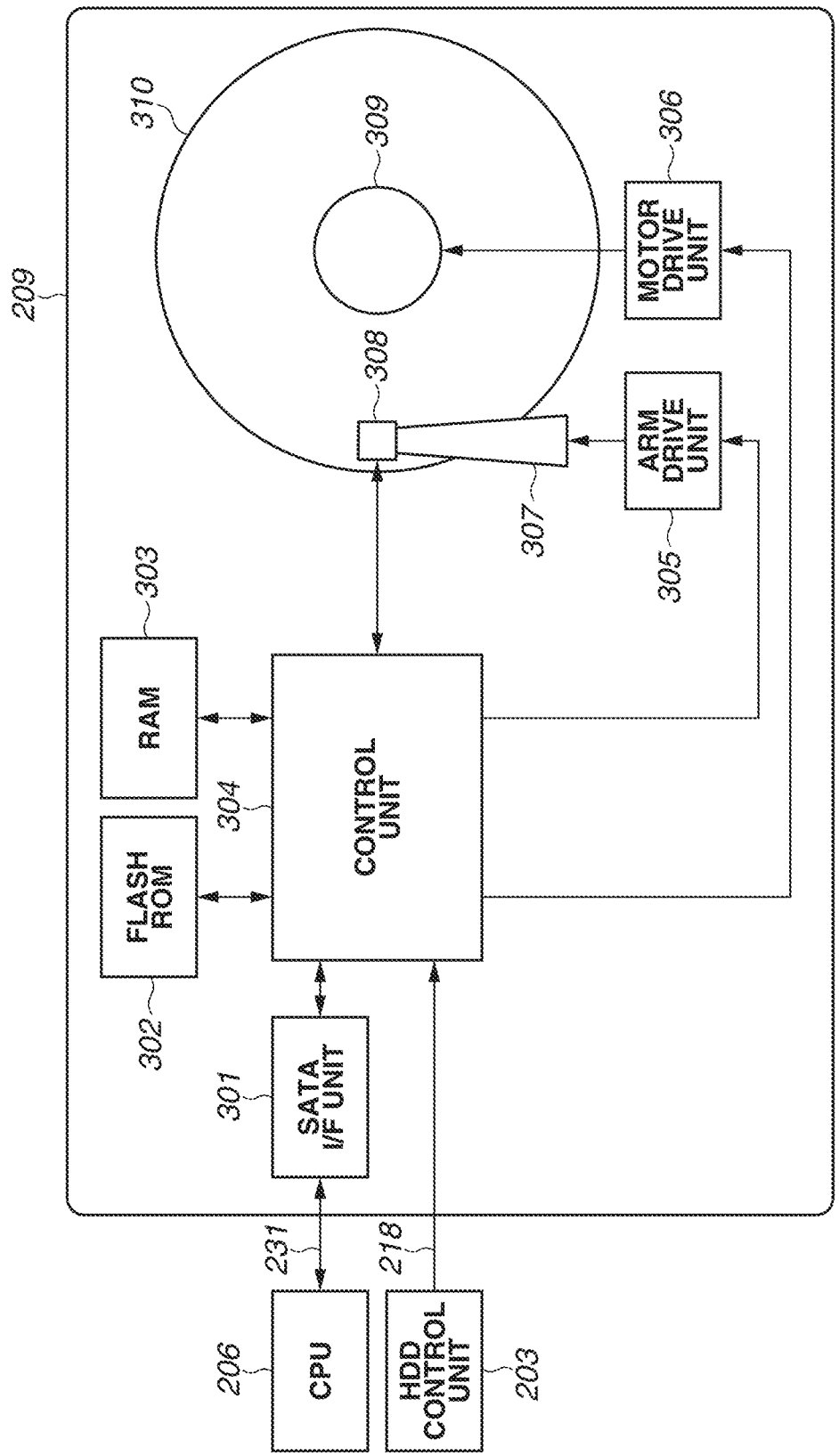
FIG. 3 is a block diagram illustrating an internal configuration of a hard disk drive (HDD) included in the controller unit.

FIG. 3 is a block diagram illustrating an internal configuration of the HDD 209.

The HDD 209 includes a SATA I/F unit 301, a flash ROM 302, a random access memory (RAM) 303, a control unit 304, an arm drive unit 305, a motor drive unit 306, an arm 307, a magnetic head 308, a spindle motor 309, and a platter 310.

The SATA I/F unit 301 is a unit which performs transmission and reception of data to and from the CPU 206 via the SATA interface (I/F) 231. The control unit 304 is a control unit which controls the entire HDD 209 and performs control by executing a program stored in the flash ROM 302. The RAM 303 is a temporary region which, at the time of writing data into the platter 310 via the magnetic head 308, is used to make such writing more efficient, and is a volatile memory.

The arm drive unit 305 is a unit which drives the arm 307, to which the magnetic head 308 is attached, and moves the magnetic head 308 to a data region stored on the platter 310.

The magnetic head 308 is a unit which performs data writing by exerting a magnetic force onto a magnetic substance on the surface of the platter 310 and, moreover, performs data reading by reading a magnetic resistance which varies due to the influence of a magnetic field on the platter 310. The motor drive unit 306 is a unit which drives the spindle motor 309. The spindle motor 309 is a motor which operates to rotate the platter 310. The platter 310 has a magnetic substance for recording applied to the surface of the platter 310, so that data is able to be magnetically stored on the platter 310 via the magnetic head 308.

Next, a staggered spin-up function of the HDD 209 is described with reference to FIG. 3. In a case where the logical signal of the staggered spin-up signal 218 which the HDD control unit 203 outputs is "low", upon recognition that the staggered spin-up function is disabled, the HDD 209 starts start-up processing. At the time of the staggered spin-up function being disabled, first, the control unit 304 performs initialization of the SATA I/F unit 301 according to a program stored in the flash ROM 302. After ending of initialization of the SATA I/F unit 301, the control unit 304 starts spin-up of the spindle motor 309 via the motor drive unit 306. At a point of time when the spindle motor 309 has reached a prescribed number of revolutions, the HDD 209 enters into a state of being accessible for data.

Next, in a case where the logical signal of the staggered spin-up signal 218 which the HDD control unit 203 outputs is "open" (enabled), since pull-up processing is being performed on the side of the HDD 209, the staggered spin-up signal 218 enters into a high state following up the HDD power path 238.

In a case where the staggered spin-up signal 218 is in a high (enabled) state at the time of power-on of the HDD 209, the HDD 209 recognizes that the staggered spin-up function is enabled and thus starts start-up processing. When the staggered spin-up function is enabled, the control unit 304 performs only initialization of the SATA I/F unit 301 and does not start spin-up of the spindle motor 309, according to a program stored in the flash ROM 302.

After recognizing that a data access request generated by the CPU 206 has been received via the SATA I/F unit 301, the control unit 304 starts spin-up of the spindle motor 309 via the motor drive unit 306. At a point of time when the spindle motor 309 has reached a prescribed number of revolutions, the HDD 209 enters into a state of being accessible for data. Furthermore, the data access request is, for example, a write request for data or a read request for data.

Figure 4:
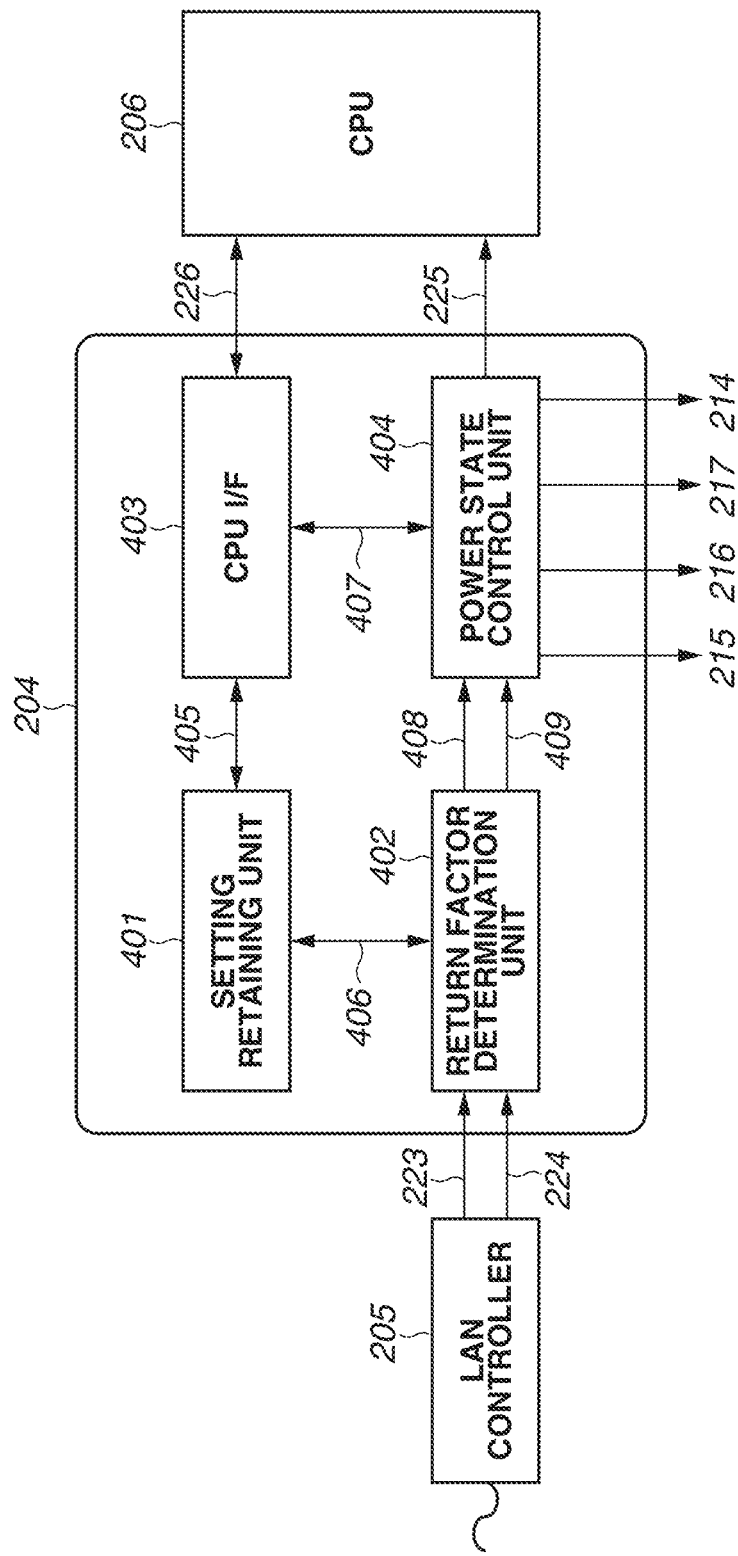
FIG. 4 is a block diagram illustrating an internal configuration of a power control unit included in the controller unit.

FIG. 4 is a block diagram illustrating an internal configuration of the power control unit 204. The power control unit 204 includes a setting retaining unit 401, a return factor determination unit 402, a CPU I/F 403, and a power state control unit 404. The setting retaining unit 401 retains return setting information indicating whether to start up the staggered spin-up function in an enabled state or in a disabled state with respect to the HDD 209, for each return-from-sleep factor. FIG. 15A illustrates a list of pieces of return setting information.

Referring to FIG. 15A, if a return-from-sleep factor received from the LAN controller 205 is a non-print job system (an inquiry system), the staggered spin-up function is made enabled as shown in row 1502. If a return-from-sleep factor received from the LAN controller 205 is a print job system, the staggered spin-up function is made disabled as shown in row 1501.

In the first exemplary embodiment, at the time of receiving a return request signal 224 for a non-print job serving as a return-from-sleep factor transmitted from the LAN controller 205, since there is a high possibility that a response is able to be made without use of an HDD, the staggered spin-up function is assumed to be made enabled. This enables reducing power consumption caused by spin-up of the spindle motor at the time of start-up of an HDD. Moreover, although the spindle motor of an HDD is limited in the number of times of spin-up, if the staggered spin-up function is used, even when the HDD is powered on, unless a SATA command is received, the number of times of spin-up is not consumed.

On the other hand, at the time of receiving a return request signal involving the use of an HDD, the staggered spin-up function is assumed to be made disabled. For example, in the first exemplary embodiment, since, at the time of receiving a print job, the HDD 209 is necessarily used, the staggered spin-up function at the time of receiving the print job return request signal 223 is assumed to be made disabled. Therefore, before a SATA command involving the use of the HDD 209 is received, spin-up of the spindle motor 309 is started. Thus, disabling the staggered spin-up function enables shortening a time required for an HDD access to become possible as compared with a case where the staggered spin-up function is enabled.

Upon receiving a return request signal, the return factor determination unit 402 reads, from the setting retaining unit 401, staggered spin-up setting information corresponding to the received return request signal. In a case where the staggered spin-up setting information corresponding to the received return request signal indicates that the staggered spin-up function is enabled, the return factor determination unit 402 notifies the power state control unit 404 of that effect via a spin-up enabling signal 408. In a case where the staggered spin-up setting information indicates that the staggered spin-up function is disabled, the return factor determination unit 402 notifies the power state control unit 404 of that effect via a spin-up disabling signal 409.

Upon receiving the spin-up enabling signal 408, the power state control unit 404 sets the staggered spin-up control signal 217 to an enabled state so as to cause the HDD 209 to return from sleep with the staggered spin-up function set to an enabled state. After such setting, the power state control unit 404 sets a return-from-sleep state to the CPU 206 via the return request signal 225. Then, the power state control unit 404 notifies the second power supply unit 202, the HDD control unit 203, and the first power supply unit 106 of starting of power supply via the control signals 214 and 215 and the HDD power control signal 216.

Moreover, upon receiving the spin-up disabling signal 409, the power state control unit 404 sets the staggered spin-up control signal 217 to a disabled state so as to cause the HDD 209 to return from sleep with the staggered spin-up function set to a disabled state. After such setting, the power state control unit 404 sets a return-from-sleep state to the CPU 206 via the return request signal 225. Then, the power state control unit 404 notifies the second power supply unit 202, the HDD control unit 203, and the first power supply unit 106 of starting of power supply via the control signals 214 and 215 and the HDD power control signal 216.

The CPU I/F 403 performs access control with respect to the CPU 206. When the CPU 206 sets staggered spin-up setting information to the setting retaining unit 401, data is transmitted and received via the CPU I/F 403. Moreover, at the time of a transition to a sleep state, the CPU 206 sets such a transition to the power state control unit 404 via the CPU I/F 403. Then, the power state control unit 404 notifies the second power supply unit 202, the HDD control unit 203, and the first power supply unit 106 of power shut-down via the control signals 214 and 215 and the HDD power control signal 216.

Figure 5:
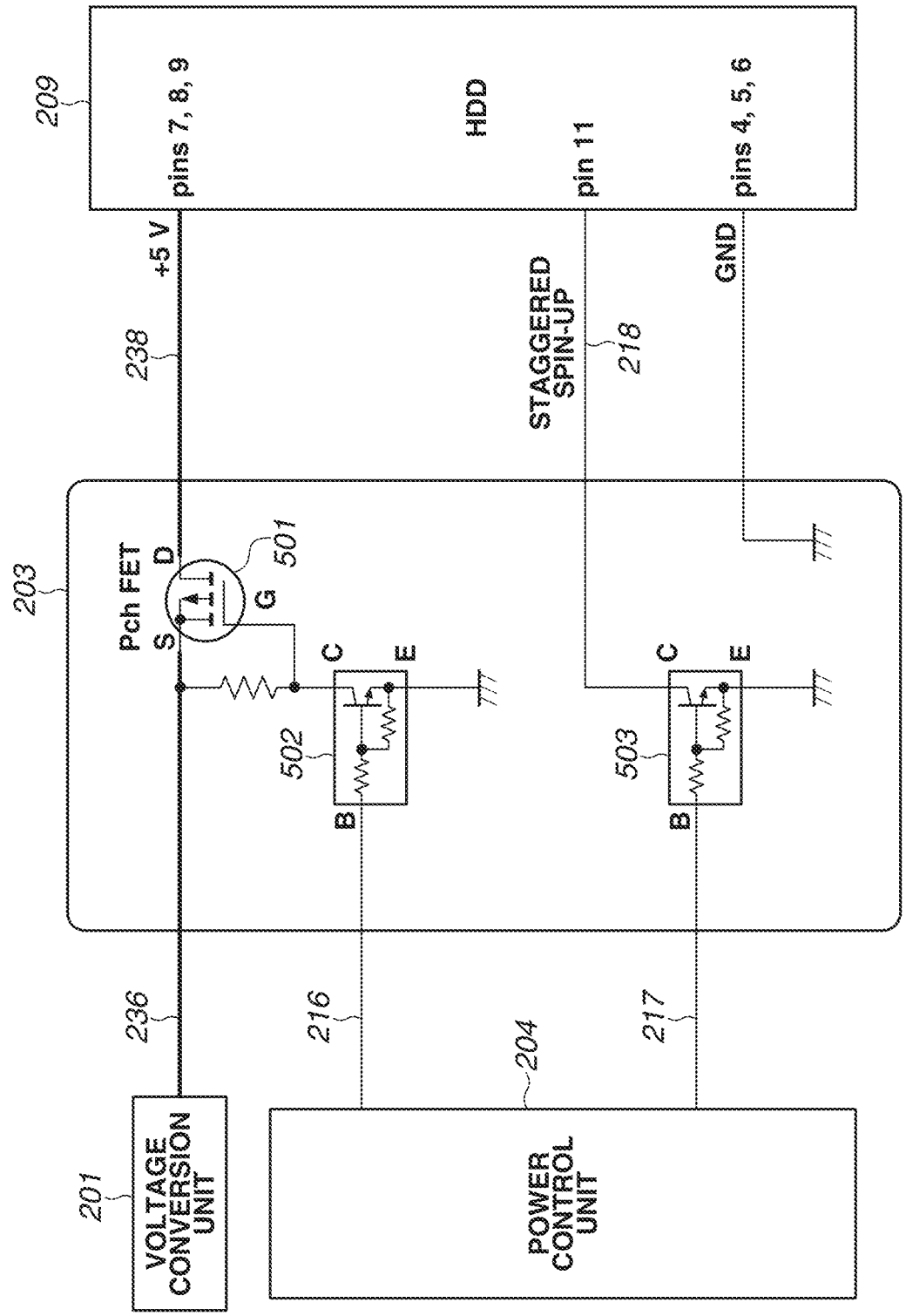
FIG. 5 is a block diagram illustrating an internal configuration of an HDD control unit included in the controller unit.

FIG. 5 is a block diagram illustrating an internal configuration of the HDD control unit 203.

The HDD control unit 203 includes a field-effect transistor (FET) 501 and digital transistors 502 and 503. The FET 501 has a source terminal connected to power 236 supplied from the voltage conversion unit 201, a gate terminal connected to a collector terminal of the digital transistor 502, and a drain terminal connected to an HDD power path 238 of the HDD 209.

Furthermore, the FET 501 to be used includes a p-channel power metal-oxide semiconductor field-effect transistor (MOSFET). The digital transistor 502 has a base terminal connected to an HDD power control signal 216 output from the power control unit 204, a collector element connected to the gate terminal of the FET 501, and an emitter terminal connected to ground. Furthermore, the gate terminal of the FET 501 is processed for pull-up with the power 236 supplied from the voltage conversion unit 201.

The digital transistor 503 has a base terminal connected to a staggered spin-up control signal 217 supplied from the power control unit 204, a collector terminal connected to a staggered spin-up signal 218 connected to the HDD 209, and an emitter terminal connected to ground. Furthermore, with regard to the pin arrangement of power connectors of the HDD 209, pins 7, 8, and 9 are allocated to power of 5 volts (V), pins 4, 5, and 6 are allocated to ground, and pin 11 is allocated to the staggered spin-up function.

FIGS. 10A and 10B are timing charts illustrating return-from-sleep processing for the HDD control unit 203.

FIG. 10A is a timing chart in the HDD control unit 203 when the staggered spin-up function is set disabled. Upon receiving a return-from-sleep request, the power control unit 204 starts return-from-sleep processing according to the staggered spin-up setting information. In return processing which is performed when the staggered spin-up function is disabled, the power control unit 204 sets the staggered spin-up control signal 217 to "high" (H) at timing 1001.

When a voltage is applied to the staggered spin-up control signal 217, the digital transistor 503 enters into an on-state. When the digital transistor 503 enters into an on-state, the staggered spin-up signal 218 becomes "low" (L).

Next, the power control unit 204 sets the HDD power control signal 216 to "high" (H) at timing 1002. When a voltage is applied to the HDD power control signal 216, the digital transistor 502 enters into an on-state. When the digital transistor 502 enters into an on-state, an electrical potential difference occurs between the source terminal and gate terminal of the FET 501, so that the FET 501 enters into an on-state. When the FET 501 enters into an on-state, electrical power is supplied to the HDD 209 via the FET 501 at timing 1003.

Next, FIG. 10B is a timing chart in the HDD control unit 203 when the staggered spin-up function is set enabled. Upon receiving a return-from-sleep request, the power control unit 204 starts return-from-sleep processing according to the staggered spin-up setting information. In return processing which is performed when the staggered spin-up function is enabled, the power control unit 204 sets the staggered spin-up control signal 217 to "low" (L) at timing 1004.

When no voltage is applied to the staggered spin-up control signal 217, the digital transistor 503 remains in an off-state. When the digital transistor 503 is in an off-state, the staggered spin-up signal 218 enters into an open state, so that, following the HDD power path 238, the staggered spin-up signal 218 becomes "high" (H). Next, the power control unit 204 sets the HDD power control signal 216 to "high" (H) at timing 1005.

When a voltage is applied to the HDD power control signal 216, the digital transistor 502 enters into an on-state. When the digital transistor 502 enters into an on-state, an electrical potential difference occurs between the source terminal and gate terminal of the FET 501, so that the FET 501 enters into an on-state. When the FET 501 enters into an on-state, electrical power is supplied to the HDD 209 via the FET 501 at timing 1006.

Furthermore, here, a configuration has been described in which, in a case where the staggered spin-up function is enabled, the staggered spin-up control signal 217 is set to "low" (L) and the staggered spin-up signal 218 is set to "high" (H) and, in a case where the staggered spin-up function is disabled, the staggered spin-up control signal 217 is set to "high" (H) and the staggered spin-up signal 218 is set to "low" (L). However, due to depending on the circuit configuration of the HDD control unit 203 illustrated in FIG. 5, the present exemplary embodiment is not limited to this configuration. For example, a configuration in which, in a case where the staggered spin-up function is enabled, the staggered spin-up control signal 217 is set to "high" and the staggered spin-up signal 218 is set to "low" (L) and, in a case where the staggered spin-up function is disabled, the staggered spin-up control signal 217 is set to "low" (L) and the staggered spin-up signal 218 is set to "high" can be employed. This also applies to the HDD power control signal 216.

Figure 6:
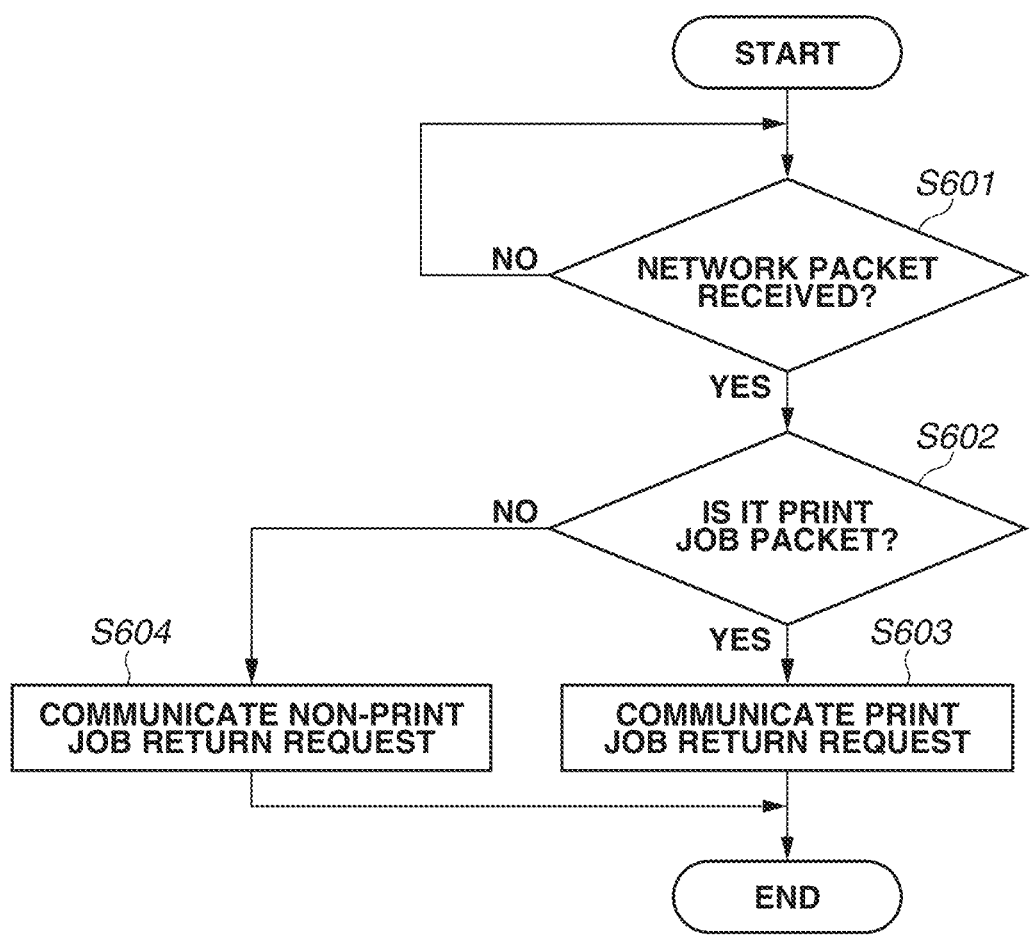
FIG. 6 is a flowchart illustrating a control procedure for return-from-sleep processing which a local area network (LAN) controller included in the controller unit performs.

FIG. 6 is a flowchart illustrating a control procedure for return-from-sleep processing which the LAN controller 205 performs. Furthermore, specifically, a CPU (not illustrated) included in the LAN controller 205 performs the return-from-sleep processing.

In step S601, the LAN controller 205 waits until receiving a network packet.

Upon receiving the network packet (YES in step S601), in step S602, the LAN controller 205 determines whether the received network packet is a print job packet such as print data. The method of determining whether the received network packet is a print job packet can include making a determination based on a destination port number of Transmission Control Protocol (TCP) of the network packet. For example, in a case where the destination port number of TCP is the RAW print port number (0X238C), the LAN controller 205 can determine that the received network packet is a print job packet, and, in the other cases, the LAN controller 205 can determine that the received network packet is not a print job packet. The print job packet is a packet signal which the LAN controller 205 receives.

If, in step S602, it is determined that the received network packet is a print job packet (YES in step S602), then in step S603, the LAN controller 205 notifies the power control unit 204 of that effect via the print job return request signal 223.

If, in step S602, it is determined that the received network packet is not a print job packet (NO in step S602), then in step S604, the LAN controller 205 notifies the power control unit 204 of that effect via the non-print job return request signal 224. The case where the received network packet is not a print job packet is, for example, a case where the received network packet is a packet for making an inquiry to the image processing apparatus. The packet for making an inquiry includes, for example, a packet for requesting status information. The status information includes, for example, an operating time of the image processing apparatus, a paper type, information about the remaining amount of ink, and billing information. Since these pieces of information are retained in the memory 207, when the image processing apparatus is in a sleep state, it is not necessary to spin up the spindle motor of the HDD.

Figure 7:
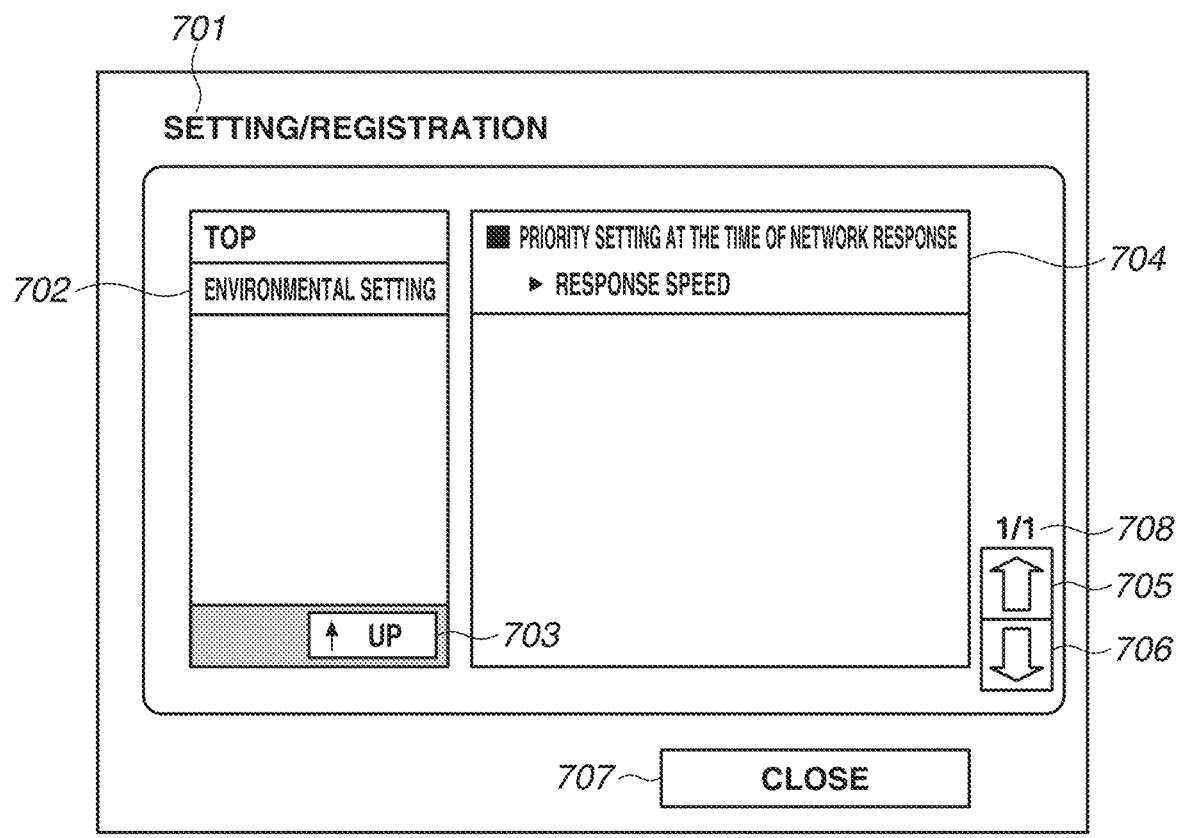
FIG. 7 is a diagram illustrating a user interface screen structure which is displayed on an operation unit, which is included in the image processing apparatus, to register or change setting values for the image processing apparatus.

FIG. 7 is a diagram illustrating a user interface screen structure which is displayed on the operation unit 105 to be used to set and register setting values of the image processing apparatus. The user interface screen structure for setting and registration illustrated in FIG. 7 is controlled by the CPU 206 based on software stored in the HDD 209.

The user interface screen for setting and registration transitions in the case of changing setting values of the image processing apparatus. The title 701 of the user interface screen for setting and registration is displayed as "setting/registration". A hierarchy window 702, which indicates the hierarchy of a setting/registration menu, shows hierarchy information about the setting/registration menu in the image processing apparatus which is currently selected. A detailed menu display window 704 displays a list of detailed menus which the user is able to select in the current menu layer and the current setting values.

In the user interface screen for setting and registration illustrated in FIG. 7, the user is able to set priority setting at the time of network response in the image processing apparatus. Since a configuration in which setting information registered via the user interface screen for setting and registration is set to the setting retaining unit 401 and, at the same time, retained in the HDD 209 based on control of the CPU 206 is employed, even if the image processing apparatus is powered off, various settings are stored.

An up button 703 is a button used for the user to select to move to a menu which is one layer upper than the current menu layer. A close button 707 is a button used for the user to select to close a menu which is being displayed.

A detailed menu page number display field 708 is displayed to inform the user of a page number of the page which is currently displayed in the detailed menu composed of a plurality of pages. A movement-to-previous-page instruction button 705 is a button used to issue an instruction to move to a page one page previous to the page number of the page which is currently displayed in the detailed menu composed of a plurality of pages and is displayed in cooperation with the detailed menu page number display field 708. A movement-to-next-page instruction button 706 is a button used to issue an instruction to move to a page one page next to the page number of the page which is currently displayed in the detailed menu composed of a plurality of pages and is displayed in cooperation with the detailed menu page number display field 708.

Figure 8:
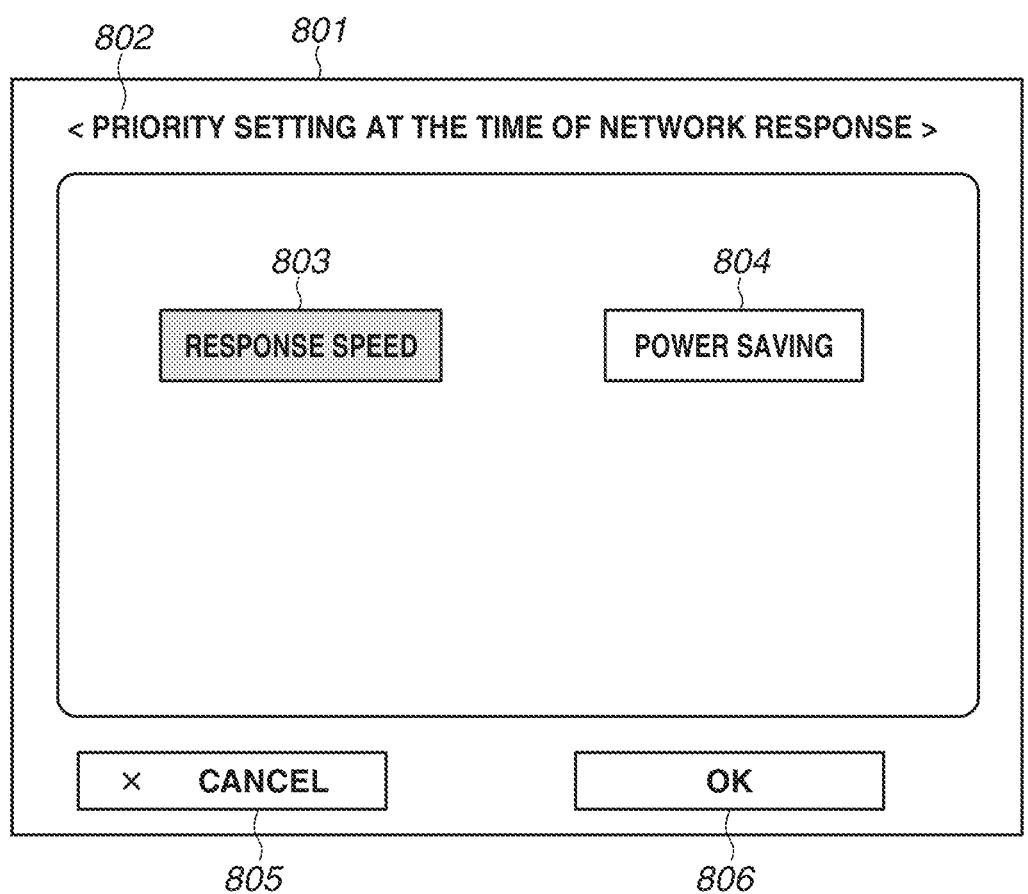
FIG. 8 is a diagram illustrating a user interface screen structure which is displayed on the operation unit, to register or change priority setting at the time of network response.

FIG. 8 is a diagram illustrating a user interface screen structure which is displayed on the operation unit 105 to register and change priority setting at the time of network response.

The user interface screen structure for network response priority setting illustrated in FIG. 8 is controlled by the CPU 206 based on software stored in the HDD 209. A network response priority setting user interface screen 801 is a user interface screen which is displayed on the operation unit 105 when the item of priority setting at the time of network response in the detailed menu display window 704 has been selected. A configuration in which the settings illustrated in FIG. 15A are able to be changed via the user interface screen can be employed.

Furthermore, a network response priority setting which is able to be set via the network response priority setting user interface screen 801 is an operation setting at the time of reception of a return-from-sleep request in receiving a packet which is not a print job packet. A title 802 of the network response priority setting user interface screen is displayed as "priority setting at the time of network response". In the case of setting the priority setting at the time of network response to "response speed", the user selects a response speed button 803 and then presses an OK button 806.

After detecting selection of the response speed button 803 and pressing of the OK button 806, the CPU 206 sets, in the setting retaining unit 401, staggered spin-up setting information at the time of reception of a return-from-sleep request in receiving a packet which is not a print job packet to "disabled". Additionally, the CPU 206 also performs updating of setting values of a target stored in the HDD 209. In the case of setting priority setting at the time of network response to power saving, the user selects a power saving button 804 and then presses the OK button 806.

After detecting selection of the power saving button 804 and pressing of the OK button 806, the CPU 206 sets, in the setting retaining unit 401, staggered spin-up setting information at the time of reception of a return-from-sleep request in a non-print job to "enabled". Additionally, the CPU 206 also performs updating of setting values of a target stored in the HDD 209. A cancel button 805 is a button which the user selects when canceling registration or change of the priority setting at the time of network response.

Figure 9:
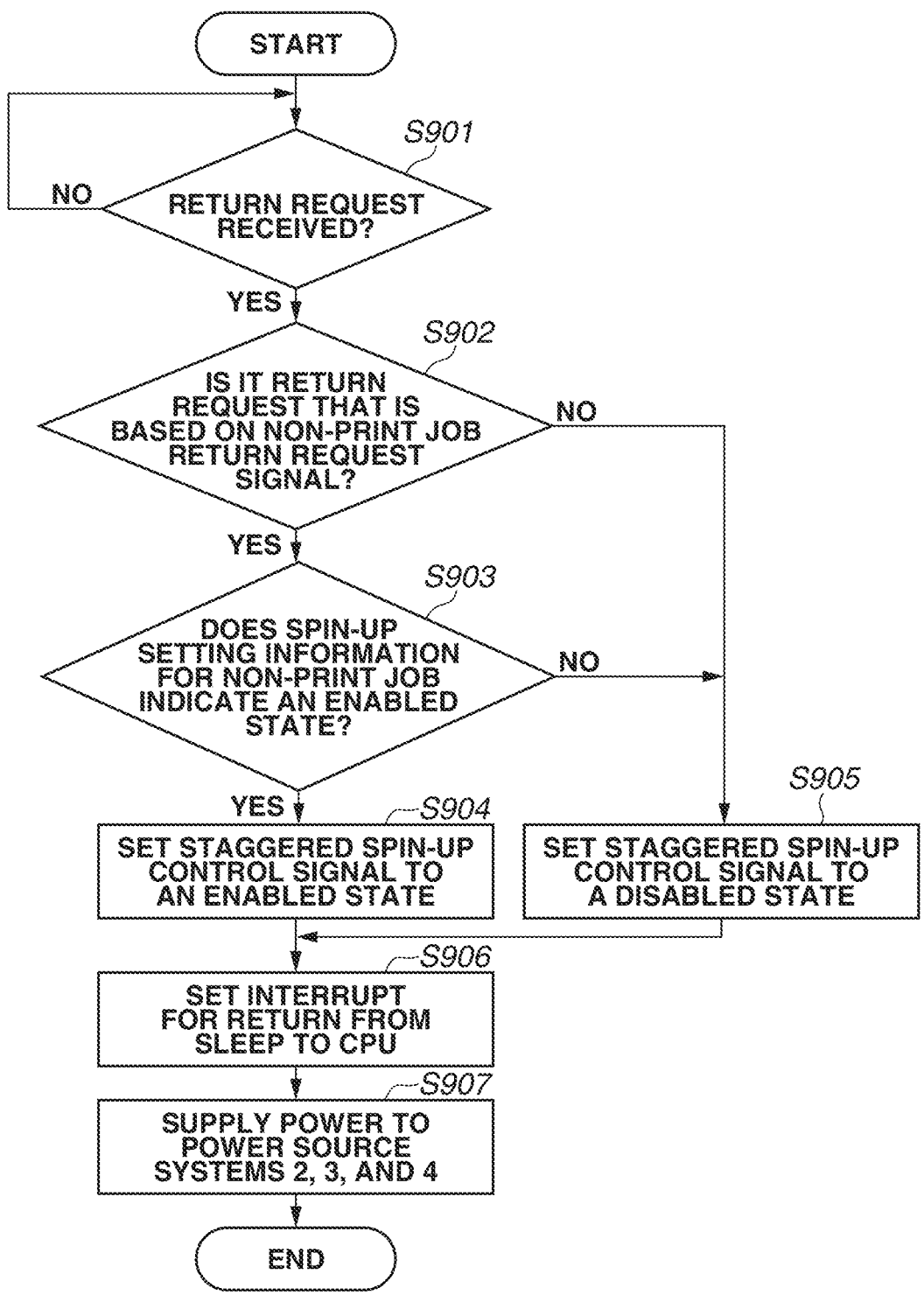
FIG. 9 is a flowchart illustrating a control procedure for return-from-sleep processing which the power control unit performs.

FIG. 9 is a flowchart illustrating a control procedure for return-from-sleep processing which the power control unit 204 performs. In the first exemplary embodiment, the present flowchart is implemented by a circuit configuration of the power control unit 204. However, a CPU can be incorporated in the power control unit 204 to implement the present flowchart.

Furthermore, in the first exemplary embodiment, the power control unit 204 is assumed to retain setting information concerning the non-print job return request signal 224, which is a return-from-sleep factor, supplied from the LAN controller 205. Then, since, at the time of reception of a print job, the HDD 209 is used, the staggered spin-up function is assumed to be set disabled.

In step S901, the return factor determination unit 402 of the power control unit 204 checks signal states of the print job return request signal 223 and the non-print job return request signal 224 suppled from the LAN controller 205, and waits until receiving a return request. Upon receiving the return request (YES in step S901), the return factor determination unit 402 advances the processing to step S902.

In step S902, the return factor determination unit 402 determines whether the received return request is a return request that is based on the non-print job return request signal 224. If it is determined that the received return request is a return request that is based on the non-print job return request signal 224 (YES in step S902), the return factor determination unit 402 advances the processing to step S903.

In step S903, the return factor determination unit 402 acquires, from the setting retaining unit 401, staggered spin-up setting information obtained at the time of reception of the non-print job return request signal 224 and determines whether the acquired setting information indicates an enabled state. If it is determined that the acquired setting information indicates an enabled state (YES in step S903), the return factor determination unit 402 advances the processing to step S904.

In step S904, the return factor determination unit 402 communicates the spin-up enabling signal 408 to the power state control unit 404. Upon receiving the spin-up enabling signal 408, the power state control unit 404 sets the staggered spin-up control signal 217 to an enabled state to cause the staggered spin-up function to return from sleep. In response to the staggered spin-up control signal 217 being set to an enabled state, the staggered spin-up function is set enabled with respect to the HDD control unit 203. Therefore, when the HDD 209 returns from sleep, the staggered spin-up function is caused to return in an enabled state.

Upon completion of step S904, the power state control unit 404 advances the processing to step S906.

The description refers back to step S903. If, in step S903, it is determined that the acquired staggered spin-up setting information indicates a disabled state (NO in step S903), the return factor determination unit 402 advances the processing to step S905. Step S905 is described below.

The description refers back to step S902. If, in step S902, it is determined that the received return request is a return request that is based on other than the non-print job return request signal 224 (NO in step S902), the return factor determination unit 402 advances the processing to step S905.

In step S905, the return factor determination unit 402 communicates the spin-up disabling signal 409 to the power state control unit 404. Upon receiving the spin-up disabling signal 409, the power state control unit 404 sets the staggered spin-up control signal 217 to a disabled state. In response to the staggered spin-up control signal 217 being set to a disabled state, the staggered spin-up function is set disabled with respect to the HDD control unit 203. Therefore, when the HDD 209 returns from sleep, the staggered spin-up function is caused to return in a disabled state. Upon completion of step S905, the power state control unit 404 advances the processing to step S906.

In step S906, the power state control unit 404 sets an interrupt for return from sleep to the CPU 206 via the return-from-sleep request signal 225. Upon receiving the return-from-sleep request signal 225, the CPU 206 transitions from the sleep state to the normal state.

In step S907, finally, the power state control unit 404 communicates starting of power supply to the second power supply unit 202, the HDD control unit 203, and the first power supply unit 106 via the control signals 214 and 215 and the HDD power control signal 216, thus completing the return-from-sleep processing.

According to the configuration of the first exemplary embodiment, at the time of a return from sleep occurring due to a print job, in which an HDD access occurs immediately after the return from sleep, processing for setting the staggered spin-up function disabled and powering on the HDD enables preventing delaying of the HDD access enabled time. Moreover, at the time of a return from sleep occurring due to a non-print job, in which an HDD access is unlikely to occur after the return from sleep, processing for setting the staggered spin-up function enabled and powering on the HDD enables reducing power consumption. Thus, performing spin-up control which is adapted to a situation occurring at the time of power-on of the HDD enables optimizing a response capability for the HDD access and a reduction in power consumption at the time of power-on of the HDD.

Furthermore, at the time of a return from sleep occurring due to a non-print job, in which an HDD access is unlikely to occur after the return from sleep, processing for setting the staggered spin-up function enabled and powering on the HDD further enables reducing the number of times of spin-up of the spindle motor.

Next, a second exemplary embodiment is described. In the second exemplary embodiment, portions having similar functions to those illustrated in FIG. 1 to FIGS. 10A and 10B are assigned the respective same reference characters, and the detailed description thereof is omitted here.

The second exemplary embodiment is configured to disable the staggered spin-up function not only with respect to a return-from-sleep factor supplied from the LAN controller 205 but also with respect to a return factor in which an access to an HDD occurs. Then, the second exemplary embodiment is configured to enable the staggered spin-up function with respect to a return factor in which an access to an HDD does not occur.

Furthermore, even the second exemplary embodiment is also able to set enabling and disabling of the staggered spin-up function with respect to a return-from-sleep factor via an operation screen described below.

Furthermore, descriptions with regard to FIG. 1 to FIG. 3, FIG. 5, FIG. 6, FIGS. 10A and 10B, and FIG. 15A are similar to those in the first exemplary embodiment and are, therefore, omitted here.

FIG. 11 is a block diagram illustrating an internal configuration of the power control unit 204 in the second exemplary embodiment. The power control unit 204 includes a start-up setting retaining unit 1101, a return factor determination unit 1102, a CPU I/F 1103, and a power state control unit 1104. The start-up setting retaining unit 1101 retains setting information indicating whether to start up the HDD 209 in a staggered spin-up function enabled state or in a staggered spin-up function disabled state, for each return-from-sleep factor.

In the second exemplary embodiment, the start-up setting retaining unit 1101 is assumed to retain not only a return-from-sleep factor supplied from the LAN controller 205 but also setting information concerning the return request signals 219 to 222 output from the operation unit 105, the printer unit 107, the scanner unit 108, and the FAX unit 109.

The return factor determination unit 1102 receives the print job return request signal 223, the non-print job return request signal 224, and the return request signals 219 to 222 output from the respective units of the image processing apparatus. Then, the return factor determination unit 1102 reads staggered spin-up setting information corresponding to a return request signal received from the start-up setting retaining unit 1101.

In a case where the staggered spin-up setting information indicates an enabled state, the return factor determination unit 1102 notifies the power state control unit 1104 of that effect via a spin-up enabling signal 1108. In a case where the staggered spin-up setting information indicates a disabled state, the return factor determination unit 1102 notifies the power state control unit 1104 of that effect via a spin-up disabling signal 1109.

Upon receiving the spin-up enabling signal 1108, the power state control unit 1104 sets the staggered spin-up control signal 217 to an enabled state so as to cause the HDD 209 to return from sleep with the staggered spin-up function set to an enabled state. After such setting, the power state control unit 1104 sets a return-from-sleep state to the CPU 206 via a return-from-sleep interrupt signal 225. Then, the power state control unit 1104 notifies the second power supply unit 202, the HDD control unit 203, and the first power supply unit 106 of starting of power supply via the control signals 214 and 215 and the HDD power control signal 216.

Moreover, upon receiving the spin-up disabling signal 1109, the power state control unit 1104 sets the staggered spin-up control signal 217 to a disabled state so as to cause the HDD 209 to return from sleep with the staggered spin-up function set to a disabled state. After such setting, the power state control unit 1104 sets a return-from-sleep state to the CPU 206 via the return-from-sleep interrupt signal 225. Then, the power state control unit 1104 notifies the second power supply unit 202, the HDD control unit 203, and the first power supply unit 106 of starting of power supply via the control signals 214 and 215 and the HDD power control signal 216. The CPU I/F 1103 performs access control with respect to the CPU 206.

When the CPU 206 sets staggered spin-up setting information to the start-up setting retaining unit 1101, data is transmitted and received via the CPU I/F 1103. Moreover, at the time of a transition to a sleep state, the CPU 206 sets such a transition to the power state control unit 1104 via the CPU I/F 1103. Then, the power state control unit 1104 notifies the second power supply unit 202, the HDD control unit 203, and the first power supply unit 106 of power shut-down via the control signals 214 and 215 and the HDD power control signal 216.

FIG. 15B illustrates an example of return setting information for each return-from-sleep factor which the start-up setting retaining unit 1101 retains in the second exemplary embodiment. The second exemplary embodiment is configured to set the staggered spin-up function disabled with respect to a return factor in which an access to an HDD occurs and to set the staggered spin-up function enabled with respect to a return factor in which an access to an HDD does not occur, as shown in row 1502.

Referring to FIG. 15B, if a return-from-sleep factor received from the LAN controller 205 is each of the manual feed detection 1503, the ADF document detection 1504, and the FAX incoming detection 1505, the staggered spin-up function is made disabled. Moreover, even when the received return-from-sleep factor is the time of multifunction peripheral (MFP) start-up 1506, the staggered spin-up function is made disabled.

In the manual feed detection 1503, when a sheet of paper is placed on a manual feed tray (not illustrated) included in the printer unit 107, a paper detection sensor for the manual feed tray detects the sheet and a return request signal 221 is input from the paper detection sensor to the power control unit 204.

In the ADF document detection 1504, when a document detection sensor for an auto document feeder (ADF) (not illustrated) included in the scanner unit 108 detects a document, a return request signal 220 is input from the document detection sensor to the power control unit 204.

In the FAX incoming detection 1505, when a communication interface (IF) (not illustrated) included in the FAX unit 109 receives a communication, a return request signal 219 is input from the communication IF to the power control unit 204.

Furthermore, even when the image processing apparatus is in a power-saving state, electric power is supplied to the paper detection sensor for the manual feed tray, the document detection sensor for the ADF, and the communication IF of the FAX unit 109. In the above-mentioned return-from-sleep factors, an access to an HDD for printing or scanning occurs. Therefore, the staggered spin-up function is made disabled, and, when electric power is supplied to the HDD 209 at the time of a return from the power-saving state, the spindle motor is driven.

Moreover, as illustrated in FIG. 15C, even in a case where the return-from-sleep factor is receiving an operation in the operation unit 105, the staggered spin-up function is made disabled, as shown in row 1507. This is because, when an operation in the operation unit 105 is performed, processing in which an access to an HDD occurs is likely to be performed. Furthermore, electric power can be supplied to all of the portions of the operation unit or electric power can be supplied to a part of the portions (for example, only a key used for issuing an instruction for return from sleep) of the operation unit. Moreover, at the time of start-up of the image processing apparatus (the time of a transition from the state of power-off to the state of power-on), the staggered spin-up function is made disabled. This is because, at the time of start-up of the image processing apparatus, it is necessary to read data from the HDD in association with the start-up.

Figure 12:
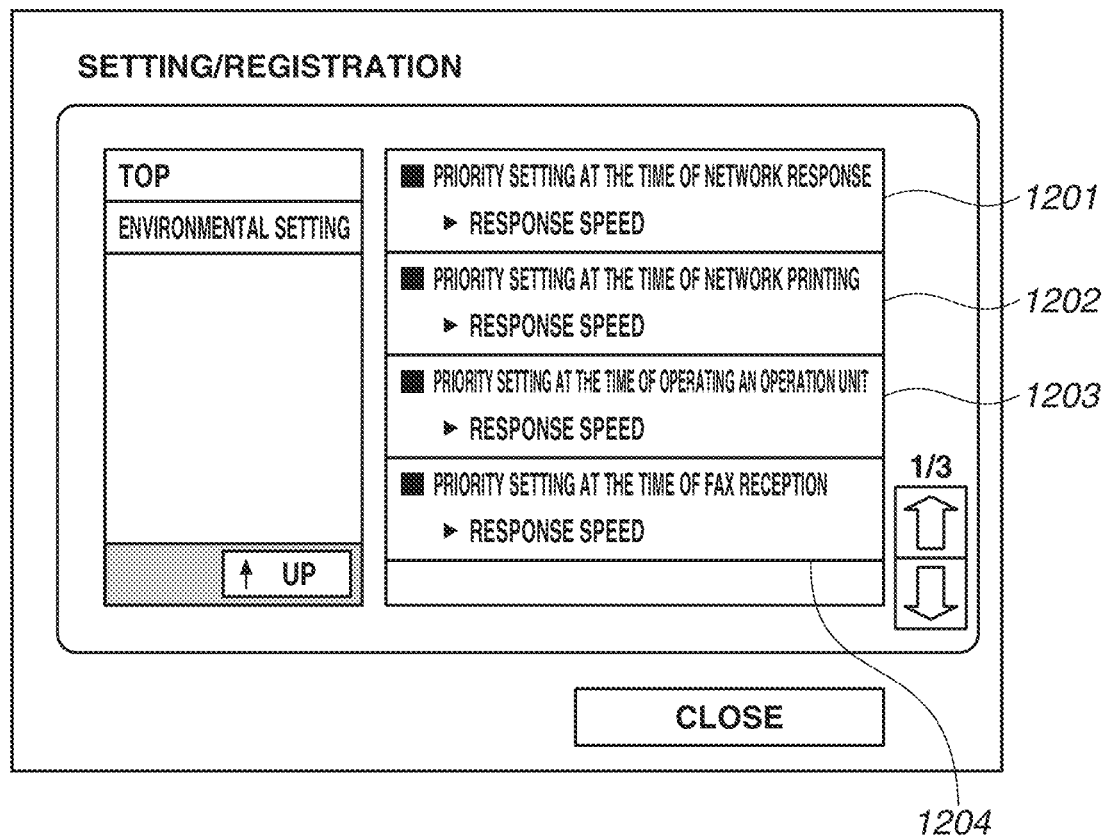
FIG. 12 is a diagram illustrating a user interface screen structure which is displayed on the operation unit to register or change setting values for the image processing apparatus.

FIG. 12 is a diagram illustrating a user interface screen structure which is displayed on the operation unit 105 to be used to set and register setting values of the image processing apparatus in the second exemplary embodiment. The basic portions of the user interface screen structure are similar to those in the first exemplary embodiment and are, therefore, omitted from description here. The user interface screen structure for setting and registration illustrated in FIG. 12 is controlled by the CPU 206 based on software stored in the HDD 209. A configuration in which the settings illustrated in FIGS. 15B and 15C are able to be changed via a setting operation on the user interface screen structure illustrated in FIG. 12 can be employed.

The user interface screen for setting and registration transitions in the case of changing setting values of the image processing apparatus. A detailed menu display window which is displayed in FIG. 12 is able to be used to set priority setting 1201 at the time of network response, priority setting 1202 at the time of network printing, priority setting 1203 at the time of operating an operation unit, and priority setting 1204 at the time of FAX reception. Displaying illustrated in FIG. 12 is composed of a plurality of pages and is also configured to allow priority setting to be performed with respect to another return-from-sleep factor. Since a configuration in which setting information registered via the user interface screen for setting and registration is set to the start-up setting retaining unit 1101 and, at the same time, retained in the HDD 209 based on control of the CPU 206 is employed, even if the image processing apparatus is powered off, various settings are stored.

Figure 13:
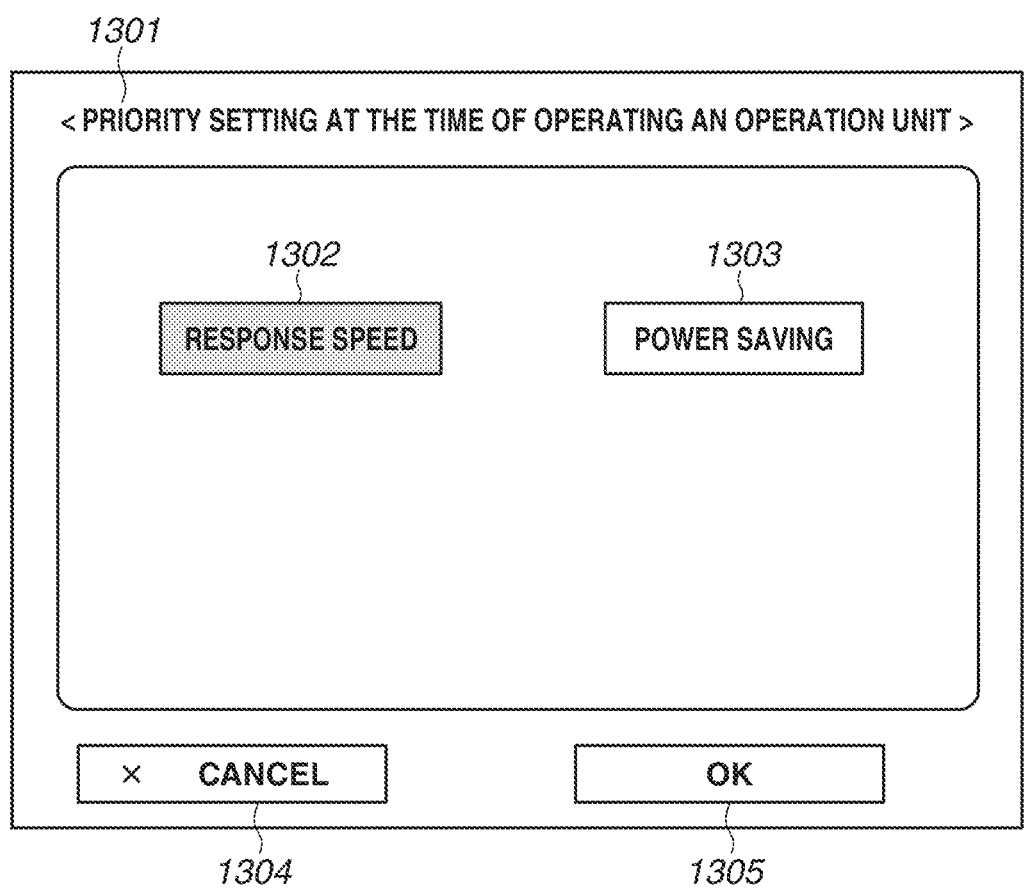
FIG. 13 is a diagram illustrating a user interface screen structure which is displayed on the operation unit, to register or change priority setting at the time of operating an operation unit.

FIG. 13 is a diagram illustrating a user interface screen structure which is displayed on the operation unit 105 to register and change priority setting at the time of operating an operation unit in the second exemplary embodiment.

The user interface screen structure for priority setting at the time of operating an operation unit illustrated in FIG. 13 is controlled by the CPU 206 based on software stored in the HDD 209. The user interface screen for priority setting at the time of operating an operation unit is a user interface screen which is displayed on the operation unit 105 when the priority setting 1203 at the time of operating an operation unit in the detailed menu display window has been selected.

Furthermore, a priority setting which is able to be set via the user interface for priority setting at the time of operating an operation unit is an operation setting at the time of detecting an operation on the operation unit when the image processing apparatus is in a sleep state. A title 1301 of the user interface screen for priority setting at the time of operating an operation unit is displayed as "priority setting at the time of operating an operation unit".

In the case of setting the priority setting at the time of operating an operation unit to "response speed", the user selects a response speed button 1302 and then presses an OK button 1305. After detecting selection of the response speed button 1302 and pressing of the OK button 1305, the CPU 206 sets, in the start-up setting retaining unit 1101, staggered spin-up setting information at the time of reception of a return-from-sleep request in operating an operation unit to "disabled". Additionally, the CPU 206 also performs updating of setting values of a target stored in the HDD 209.

In the case of setting priority setting at the time of operating an operation unit to power saving, the user selects a power saving button 1303 and then presses the OK button 1305. After detecting selection of the power saving button 1303 and pressing of the OK button 1305, the CPU 206 sets, in the start-up setting retaining unit 1101, staggered spin-up setting information at the time of reception of a return-from-sleep request in operating an operation unit to "enabled". Additionally, the CPU 206 also performs updating of setting values of a target stored in the HDD 209.

Figure 14:
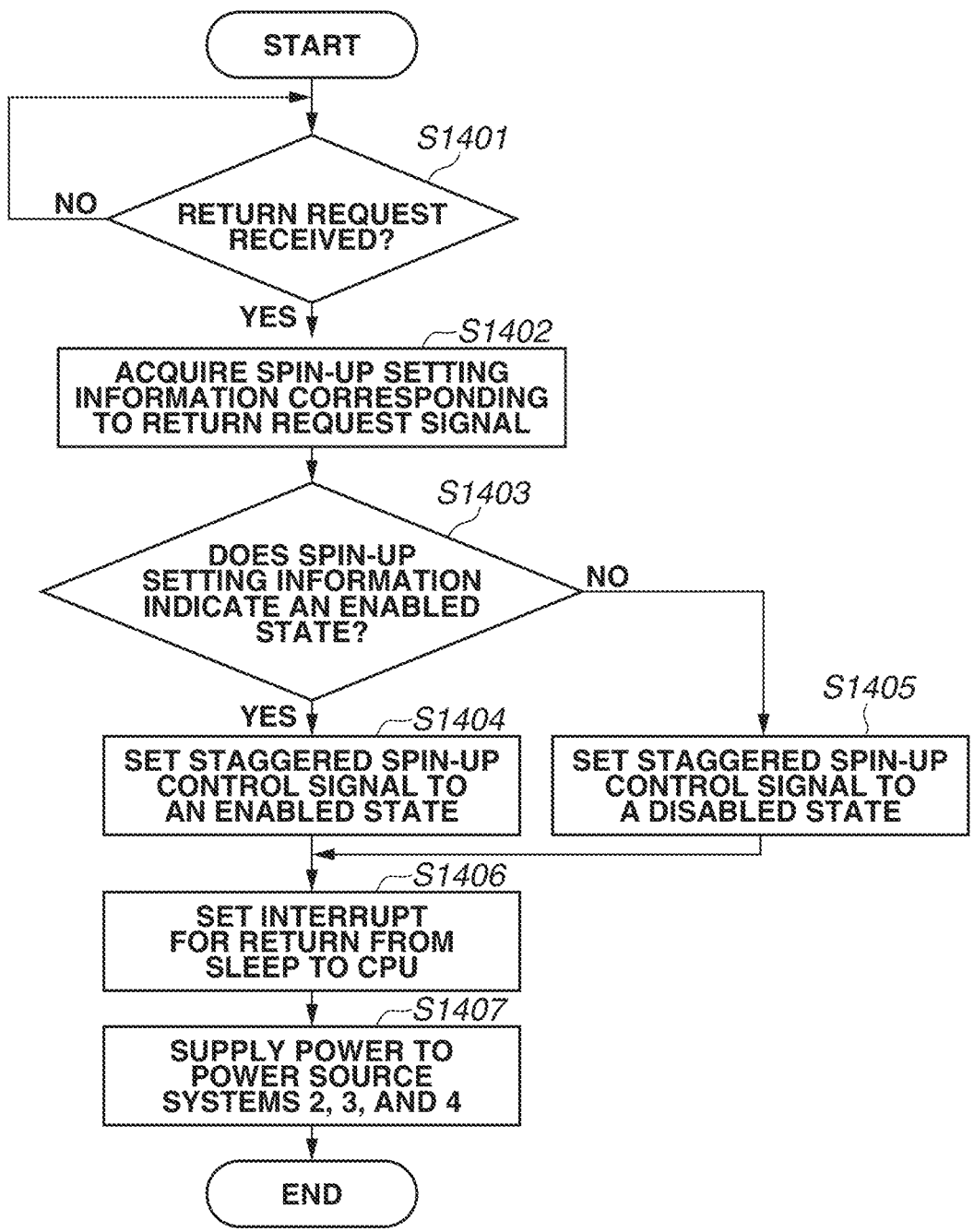
FIG. 14 is a flowchart illustrating a control procedure for return-from-sleep processing which the power control unit performs.

FIG. 14 is a flowchart illustrating a control procedure for return-from-sleep processing which the power control unit 204 performs in the second exemplary embodiment. In the second exemplary embodiment, the present flowchart is implemented by a circuit configuration of the power control unit 204. However, a CPU can be incorporated in the power control unit 204 to implement the present flowchart.

In step S1401, the return factor determination unit 1102 of the power control unit 204 checks signal states of the print job return request signal 223, the non-print job return request signal 224, and the return request signals 219 to 222 output from the respective portions of the image processing apparatus. Then, the return factor determination unit 1102 waits until receiving a return request.

Upon receiving the return request (YES in step S1401), then in step S1402, the return factor determination unit 1102 acquires staggered spin-up setting information corresponding to the return request signal from the start-up setting retaining unit 1101. Then, if, in step S1403, it is determined that the acquired staggered spin-up setting information corresponding to the received return request signal indicates an enabled state, the return factor determination unit 1102 notifies the power state control unit 1104 of that effect via the spin-up enabling signal 1108.

Upon receiving the spin-up enabling signal 1108 (YES in step S1403), in step S1404, the power state control unit 1104 sets the staggered spin-up control signal 217 to an enabled state. In response to the staggered spin-up control signal 217 being set to an enabled state, the staggered spin-up function is set enabled with respect to the HDD control unit 203. Therefore, when the HDD 209 returns from sleep, the staggered spin-up function is caused to return in an enabled state.

The description refers back to step S1403. If, in step S1403, it is determined that the acquired staggered spin-up setting information corresponding to the received return request signal indicates a disabled state, the return factor determination unit 1102 notifies the power state control unit 1104 of that effect via the spin-up disabling signal 1109.

Upon receiving the spin-up disabling signal 1109 (NO in step S1403), in step S1405, the power state control unit 1104 sets the staggered spin-up control signal 217 to a disabled state. In response to the staggered spin-up control signal 217 being set to a disabled state, the staggered spin-up function is set disabled with respect to the HDD control unit 203. Therefore, when the HDD 209 returns from sleep, the staggered spin-up function is caused to return in a disabled state.

In step S1406, after setting the staggered spin-up control signal 217, the power state control unit 1104 sets an interrupt for return from sleep to the CPU 206 via the return-from-sleep request signal 225. Finally, in step S1407, the power state control unit 1104 communicates starting of power supply to the second power supply unit 202, the HDD control unit 203, and the first power supply unit 106 via the control signals 214 and 215 and the HDD power control signal 216, thus completing the return-from-sleep processing.

According to the configuration of the second exemplary embodiment, setting the staggered spin-up function enabled or disabled depending on whether the received return factor is a return factor in which an access to an HDD occurs enables performing spin-up control which is adapted to a situation occurring at the time of power-on of the HDD. Then, performing such setting enables optimizing a response capability for the HDD access and a reduction in power consumption at the time of power-on of the HDD.

Moreover, since setting the staggered spin-up function enabled or disabled is able to be optionally performed for each return-from-sleep factor, for example, setting for reducing power consumption as much as possible depending on users or setting for making a processing time after return from sleep earlier even if only slightly becomes able to be performed.

While various examples and exemplary embodiments of the present disclosure have been described above, the gist and scope of the present disclosure are not restricted by the specific descriptions in the present specification.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015839, filed Jan. 31, 2020, which is hereby incorporated by reference herein in its entirety.

What is claimed is:

1. An information processing apparatus including a non-volatile storage device equipped with a spindle motor, the information processing apparatus comprising:
   a state controller configured to cause the information processing apparatus to transition to one of a first power state, in which electric power is supplied to the storage device, and a second power state, in which power consumption is lower than in the first power state and electric power is not supplied to at least the storage device; and
   a power controller configured to perform one of first control, which, in response to the information processing apparatus transitioning from the second power state to the first power state, together with supplying electric power to the storage device, drives the spindle motor, and second control, which, in response to the information processing apparatus transitioning from the second power state to the first power state, supplies electric power to the storage device while keeping the spindle motor stopped;
   wherein, when the information processing apparatus is in the second power state, the power controller performs the first control based on receiving a first request signal regarding a print job, and performs the second control based on receiving a second request signal regarding an inquiry.

2. The information processing apparatus according to claim 1, wherein the first request signal is an interrupt factor in which an access to the storage device does not occur, and the second request signal is an interrupt factor in which an access to the storage device occurs.

3. The information processing apparatus according to claim 1, further comprising a local area network (LAN) controller configured to receive a signal from an external apparatus via a network,
   wherein, when the information processing apparatus is in the second power state, upon receiving a signal via the network, the LAN controller analyzes the received signal, and, if the received signal is a signal related to a print job, communicates the first request signal to the state controller and, if the received signal is a signal related to an inquiry, communicates the second request signal to the state controller.

4. The information processing apparatus according to claim 1, wherein a signal related to the print job is a packet signal which a local area network (LAN) controller receives before receiving print data from an external apparatus.

5. The information processing apparatus according to claim 1, wherein a signal related to the inquiry is a signal by which an external apparatus requests status information about the information processing apparatus.

6. The information processing apparatus according to claim 1, further comprising a scanner configured to read an image of a document placed thereon,
wherein the scanner includes a detection circuit configured to detect the placed document,
wherein, when the information processing apparatus is in the second power state, electric power is supplied to the detection circuit, and
wherein, when the information processing apparatus is in the second power state, in response to the detection circuit detecting the placed document, the scanner communicates the first request signal to the state controller.

7. The information processing apparatus according to claim 1, further comprising a user interface configured to receive an operation performed by a user,
wherein electric power is supplied to at least a part of the user interface when the information processing apparatus is in the second power state, and
wherein, when the information processing apparatus is in the second power state, upon detecting an operation performed by a user, the user interface communicates the first request signal to the state controller.

8. The information processing apparatus according to claim 1, further comprising a facsimile apparatus configured to receive a facsimile job via a telephone line,
wherein the facsimile apparatus includes a communication interface (IF) configured to receive a communication from the telephone line,
wherein electric power is supplied to the communication IF when the information processing apparatus is in the second power state, and
wherein, when the information processing apparatus is in the second power state, upon receiving a communication from the telephone line, the communication IF communicates the first request signal to the state controller.

9. The information processing apparatus according to claim 1, wherein, when the information processing apparatus is powered on after being powered off, the power controller performs the second control over the storage device.

10. The information processing apparatus according to claim 1, wherein, in response to receiving the first request signal or the second request signal, the state controller causes the information processing apparatus to transition from the second power state to the first power state.

11. The information processing apparatus according to claim 1, wherein the state controller stores a request signal included in the first request signal and a request signal included in the second request signal.

12. The information processing apparatus according to claim 11, further comprising a central processing unit (CPU) configured to control a function of the information processing apparatus,
wherein the CPU is configured to perform setting as to whether to cause a third request signal which the state controller receives to be included in the first request signal or to be included in the second request signal.

13. The information processing apparatus according to claim 1, wherein the power controller controls supply of electric power to the storage device.

14. A control method for an information processing apparatus including a state controller and a non-volatile storage device equipped with a spindle motor, the state controller configured to cause the information processing apparatus to transition to one of a first power state, in which electric power is supplied to the storage device, and a second power state, in which power consumption is lower than in the first power state and electric power is not supplied to at least the storage device, the control method comprising:
when the information processing apparatus is in the second power state,
based on receiving a first request signal regarding a print job, performing first control, which, in response to the information processing apparatus transitioning from the second power state to the first power state, together with supplying electric power to the storage device, drives the spindle motor; and
based on receiving a second request signal regarding an inquiry, performing second control, which, in response to the information processing apparatus transitioning from the second power state to the first power state, supplies electric power to the storage device while keeping the spindle motor stopped.

* * * * *